Patented July 9, 1940

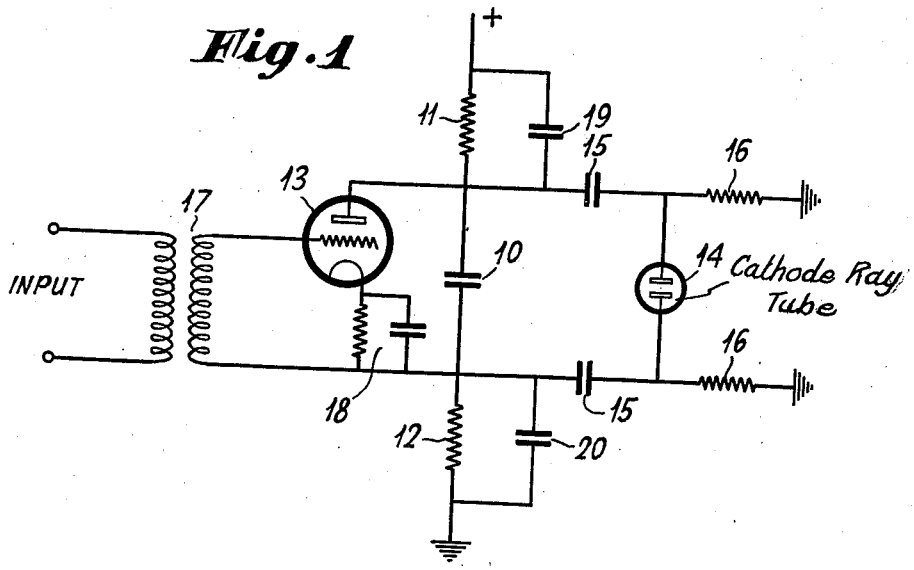
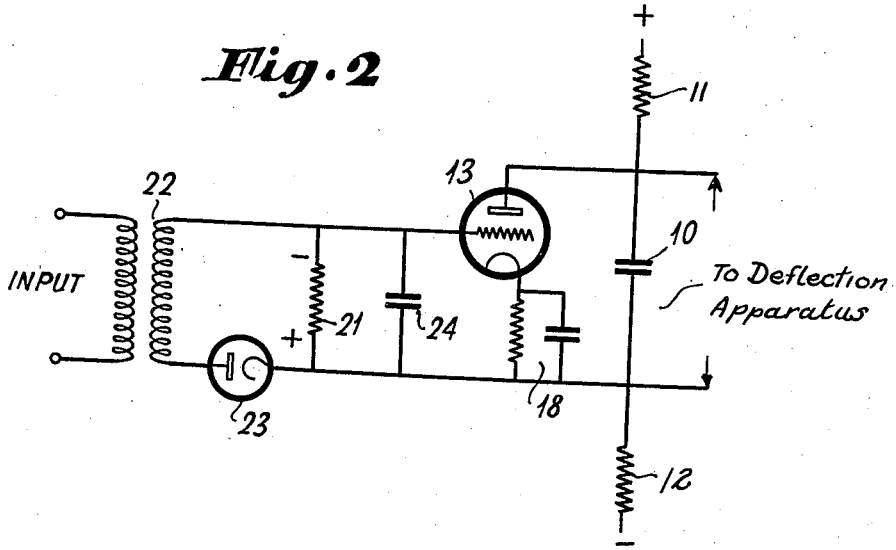

2,207,529

UNITED STATES PATENT OFFICE 2,207,529

SAW-TOOTH WAVE GENERATOR

Robert Andrieu, Berlin, Germany, assignor to Telefunken Gesellschaft für Drahtlose Telegraphie m. b. H., Berlin, Germany, a corporation of Germany Application July 13, 1938, Serial No. 218,939
In Germany February 2, 1937

6 Claims. (Cl. 250—36)

My invention relates broadly to the production of saw-tooth shaped electric waves, and more particularly to an arrangement in which electrical storage means has the potential across its terminals changed linearly in substantially opposite phase.

There has been disclosed in my co-pending applications, Serial No. 124,977, filed February 10, 1937, and Serial No. 163,970, filed September 15, 1937, a circuit arrangement of this same general nature, in which a condenser has joined thereto two resistances, each of which is connected electrically to opposite terminals of the condenser whereby one terminal or side of the condenser gradually builds up in potential to a value approaching the positive value of the charging potential, and the other terminal or side is reduced in potential gradually to a value approaching the negative potential of the source of charging supply. The condenser is connected substantially in parallel with a thermionic discharge tube whose plate to cathode electron path acts as a discharge path for the condenser when the tube is rendered conducting. Heretofore the arrangement has been such that the tube was maintained at a normally non-conductive state while at intervals the tube was rendered conducting so as to discharge the condenser at least partially. In one of the applications, the condenser was connected in a blocking oscillator circuit having inductive coupling between the plate circuit and the grid circuit, and having a time constant circuit connected in the grid circuit per se. In addition to the potential set up across the time constant circuit due to the presence of grid current, the grid circuit of the thermionic discharge tube was energized with a supplementary negative potential.

The present invention provides a time constant circuit in the cathode lead of the thermionic discharge tube independently of the blocking oscillator and also independent of the particular connection or disposition of the resistances and condensers to each other.

My invention will best be understood by reference to the drawing in which Fig. 1 illustrates one embodiment thereof, and Fig. 2 illustrates a further embodiment thereof.

Referring to Fig. 1, there is shown a condenser 10 which is adapted to be charged through a resistance 11 connected to one terminal thereof, and resistance 12 connected to the other terminal thereof, the two resistances being joined to a source of potential (not shown), the negative side of which is grounded. In general the value of resistances 11 and 12 is substantially the same. Connected in parallel with the condenser and adapted to act as a discharge path therefor is a thermionic tube 13, and by connecting in parallel here is meant that the condenser 10 is shunted individually across the plate and electrically connected to the cathode. The condenser 10 is adapted to generate or rather to impress potentials on a pair of deflecting plates 14 of a cathode ray tube through coupling condensers 15, the deflecting plates being connected to ground through resistances 16. In series with the grid of the thermionic tube 13 is the secondary 17 of an input transformer, the secondary being connected to the cathode through a time constant circuit 18 comprising a condenser and resistance connected in parallel each with the other. Shunted across each of the condensers 11 and 12 is a further condenser 19 and 20 respectively. The time constant of the condenser-resistance combination 18 should be greater than the fundamental frequency of the desired saw-tooth potential.

The production of the negative grid biasing voltage for the tube 13 is obtained by the drop of potential of the plate current across a resistance or resistances. The provision of the time constant circuit in the cathode lead of tube 13 offers the further advantage that towards the end of each line in each frame, if the cathode ray tube be used for television purposes, the negative biasing voltage is lower than at the beginning of each line of frame so that a comparatively low voltage is required to be impressed on the grid of tube 13 in order to produce the requisite pulse for making the tube conductive, and hence during the greater portion of the movement of the cathode ray beam, the tube is less apt to be rendered conducting by stray impulses or potentials. One outstanding value in the use of a time constant circuit in the cathode lead for the production of a biasing voltage is that in the presence of fluctuating potentials the impulses may be made more uniform and stable, that is to say, conditions are such that plate current impulses will differ in their amplitude less than the voltage impulses impressed on the grid. This is due to the fact that the main value of the voltage across the time constant circuit 18 is a function of the size of the plate current.

Referring to Fig. 2 in which similar numbers refer to similar parts as illustrated in Fig. 1, the condenser 10 is connected as in Fig. 1 in shunt with thermionic discharge tube 13, the latter having connected in its cathode lead the time constant circuit 18. Connected in the circuit of the thermionic tube 13 is a resistor 21 and a condenser 24, the latter being connected in shunt with the resistor 21. Also connected in parallel with the resistor 21 is a series circuit comprising the secondary 22 of the input transformer and the rectifier 23, in this particular case a diode. This circuit is particularly adaptable for use in a television receiver, for instance, wherein the synchronizing pulses are transmitted in the blacker than black direction. Increasing potentials impressed on the secondary 22 of the input transformer cause a voltage drop to be developed across resistor 21 in the fashion indicated by the plus and minus signs thereon. Accordingly, at lower amplitudes the potential of the control grid of tube 13 is rendered more positive and, therefore, the tube may be set so that for the synchronizing potential values, tube 13 may be rendered conducting so as to discharge the condenser 10. The remainder of the circuit is the same as that illustrated in Fig. 1.

What I claim is:

1. A saw-tooth wave generator comprising a condenser, a first resistor connected to one terminal thereof, a second resistor connected to the other terminal thereof, a source of energy electrically connected between said resistors for linearly charging said condenser, a thermionic discharge tube having said condenser connected in the plate-cathode circuit thereof, a time constant circuit connected in the control electrode cathode circuit and anode-cathode circuit of said thermionic tube, and means for rendering said tube conducting intermittently.

2. A saw-tooth wave generator comprising a condenser, a first resistor connected to one terminal thereof, a second resistor connected to the other terminal thereof, a source of energy electrically connected between said resistors for linearly charging said condenser, a thermionic discharge tube having said condenser connected in the plate-cathode circuit thereof, a time constant circuit connected in the control electrode cathode circuit and anode-cathode circuit of said thermionic tube, a second time constant circuit connected in the control electrode-cathode circuit of said thermionic tube, a rectifier, a series circuit comprising said rectifier and an inductance, said series circuit being connected in parallel with the second time constant circuit, and means for rendering the thermionic tube conducting intermittently.

3. Apparatus in accordance with claim 1 comprising in addition a capacity member connected in parallel with each of said resistive members.

4. A saw-tooth wave generator comprising a condenser, a first resistor connected to one terminal thereof, a second resistor connected to the other terminal thereof, a source of energy electrically connected between said resistors for linearly charging said condenser, a thermionic discharge tube having said condenser connected in the anode-cathode circuit thereof, a first time constant circuit connected in the control electrode-cathode circuit and anode-cathode circuit of said thermionic tube and a second time constant circuit connected in the control electrode-cathode circuit of said tube.

5. Apparatus in accordance with claim 2 wherein said rectifier comprises a diode.

6. Apparatus in accordance with claim 1 comprising additional means for biasing a control grid of the tube relatively to the cathode thereof.

ROBERT ANDRIEU.